(No Model.)
E. E. DURYEA.
ART OF MANUFACTURING STARCH.
No. 345,417. Patented July 13, 1886.
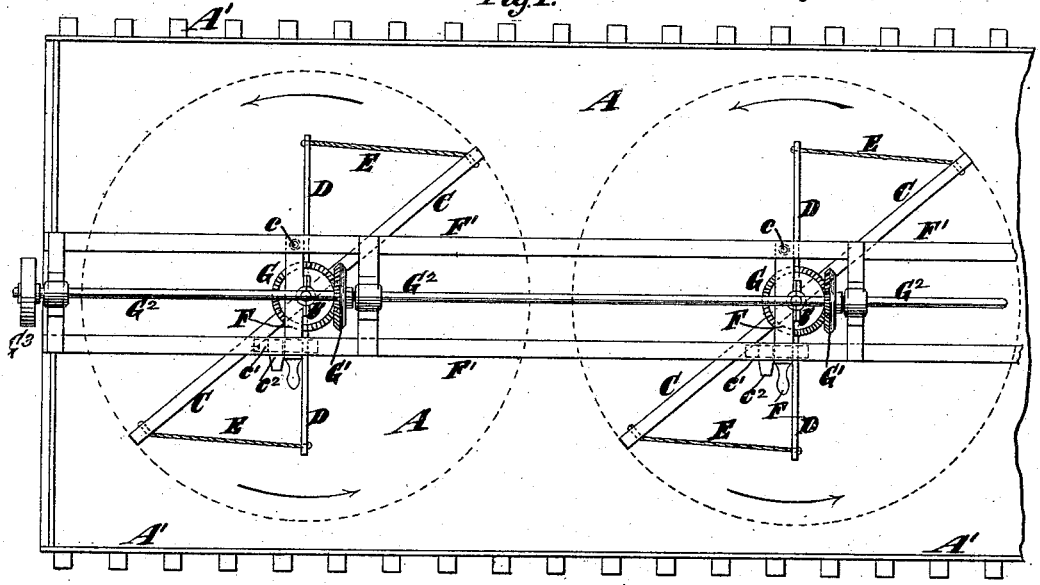
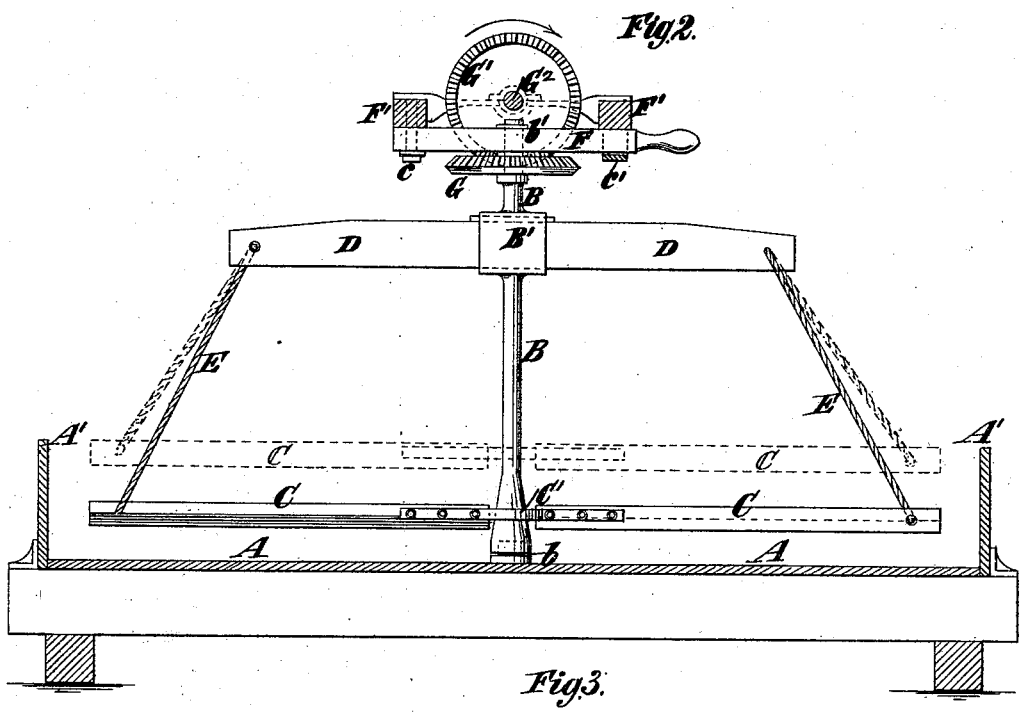
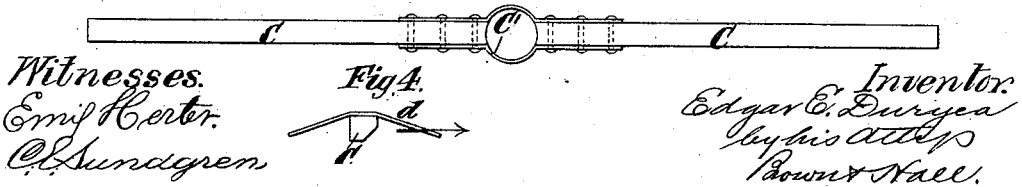
Witnesses.
Emil Herter.
C. L. Sundgren.
Inventor.
Edgar E. Duryea
by his attys
Brown & Hall.

UNITED STATES PATENT OFFICE.

EDGAR E. DURYEA, OF GLEN COVE, NEW YORK.

ART OF MANUFACTURING STARCH.

SPECIFICATION forming part of Letters Patent No. 345,417, dated July 13, 1886.

Application filed June 7, 1886. Serial No. 204,321. (No model.)

*To all whom it may concern:*

Be it known that I, EDGAR E. DURYEA, of Glen Cove in the county of Queens and State of New York, have invented a new and useful Improvement in the Art of Manufacturing Starch, of which the following is a specification.

In the manufacture of dry starch from Indian corn by any process requiring the use of starch "runs," or in which starch-depositing planes or tables are used, the starch, after deposition upon the runs in a solid and quite compact mass, is removed by shoveling, or by any other similar means, and transferred or conveyed to cisterns or other receptacles, where, by the addition of water and the employment of mechanical appliances, the starch is broken and reduced by stirring to a homogeneous and liquid condition. This starch solution is then conveyed to other cisterns or receptacles, and there washed or cleansed by one or more additions of water, and after the repeated settling of the solid particles and the decanting of the supernatent liquor the whole mass is freed from impurities, and is left in a condition of practically pure starch in a moist or "green" state, ready for the manipulation usual and requisite before being dried.

In the manufacture of glucose and grape-sugar from Indian corn by the processes ordinarily employed the starch, after deposition in a solid and compact mass upon the runs, is removed by shoveling or otherwise, and conveyed to cisterns or receptacles, where it is liquefied by the addition of water, and then undergoes the subsequent operations necessary for its conversion into glucose or grape-sugar.

My invention will be found to be advantageous in all cases for the speedy and economical removal of the starch deposited upon the runs, whether for the purpose of manufacturing dry or commercial starch, or for the conversion of starch with or without drying into glucose or grape-sugar.

The object of my invention is to convert the starch deposited upon the runs from a solid to a liquid form upon the runs themselves, and by so doing save one step or operation in the process of manufacture, and at the same time promote the economy of production.

By the method invented by me I obtain the deposit of the starch upon the runs, as heretofore, and avoid the usual laborious and expensive operation of digging up the starch from the runs and the subsequent transfer of the same in a solid form to the breaking vats or cisterns. I also save the additional expense required in providing the breaking vats or cisterns, as well as the space for their occupancy, and I effect a considerable saving in power and labor over the other methods now in use for the manufacture of starch, in which deposit planes or runs are employed.

My invention consists in an improvement in the manufacture of starch, consisting in first producing the deposition of the starch upon a starch-run or starch-plane, and in then adding water, and liquefying the starch while still upon the run or plane.

The invention also consists in first producing the deposition of starch upon a starch-run or starch-plane, and in then liquefying the starch, while still upon the run or plane, by the combined action of rubbers or scrapers having a rotary or other motion, and water which is kept in rotary or other motion on the surface of the starch deposit by the rubbers or scrapers.

My invention further consists in a method of liquefying compact and solid starch deposits, consisting in subjecting the surface of the deposit to the combined action of rubbers or scrapers and water kept in motion by the rubbers or scrapers.

In carrying out my invention in the manufacture of starch different forms of apparatus may be employed; but for the purpose of illustration I have shown in the accompanying drawings one simple form of apparatus which forms the subject of my pending application, Serial No. 204,777, and filed June 10, 1886.

In the drawings, Figure 1 is a plan of a portion of a starch run or plane having combined with it rubbers or scrapers for liquefying the starch while upon the run or plane. Fig. 2 is a transverse section of the run or plane and apparatus employed therewith. Fig. 3 is a plan of a cross beam or bar forming two rubbing or scraping arms, and Fig. 4 is an end view of one of these arms.

Similar letters of reference designate corresponding parts in all the figures; and it will be understood that I here make no claim to the apparatus for carrying out my invention, as such apparatus forms the subject of my aforesaid application.

A designates the bottom, and A' the sides, of a starch run or plane, which may be of the usual or suitable length.

In carrying out my invention I prefer to make the starch run or plane somewhat wider than is now usual; but this is not essential, as the invention may be carried out upon runs or planes of the ordinary width now in use.

The form of apparatus here illustrated and employed in connection with the starch run or plane comprises upright shafts B, arms or bars C, projecting radially from the shafts and forming the rubbers or scrapers which act upon the starch deposit, and other arms, D, which are rigidly secured to the upper portions of the shafts, and which, through suitable connections, E, move the rubbing or scraping arms C in a rotary direction as the shafts B are turned. A suitable number of such shafts with their rubbing or scraping arms should be arranged at intervals along the run or plane in order that the rubbing or scraping arms C shall move in their travel over the principal portion of the surface of the starch deposit. The upright shafts B are supported by a step-bearing, $b$, at the bottom of the run, and at their upper ends are supported in bearings $b'$, which, as here shown, are attached to cross beams or pieces F, hung from horizontal girders F'. The upright shafts throughout the length of the run are driven through bevel gear-wheels G G' from a horizontal driving-shaft, $G^2$, which may be rotated by a belt over a driving-pulley, $G^3$.

Any mechanism other than the upright-shafts and the horizontal driving-shafts $G^2$, may be employed for operating the rubbing or scraping arms or blades C.

As here represented, the cross pieces or bars F are pivoted at their one end, $c$, and at opposite ends are received in hangers or keepers $c'$, in which they may be moved laterally.

In the hangers $c'$, with the piece or bar, F, is a wedge-block or filling-piece, $c^2$, which, when introduced on one side of the piece or bar F, holds the bevel gear-wheel G in engagement with the wheel G', and when withdrawn and introduced on the other side of the piece or bar F said block holds the wheel G out of engagement with the wheel G'. This construction provides in a simple way for stopping the upright shafts B when it is not desired to rotate them, and while depositing starch upon the run or plane; but the same result may be secured in any other suitable manner.

I prefer that the step-piece or block $b$, to which the lower end of the shaft B is fitted, shall be wedge-shaped or pointed in the opposite direction to that in which is the flow of starch-fluid upon the run while depositing starch, so that it will interfere but little if any with the smooth flow of starch-fluid.

As here represented, the two arms, C, are connected by straps C', as best shown in Fig. 3, so as to hold them upon the shaft B and leave them free to rise and fall thereon.

The rigid arms D or drivers, which serve to move the rubbing or scraping arms C, may be formed in a single bar of wood or metal, which is secured in a socket, B', transverse to the shaft B, and wedged or otherwise held therein.

While depositing starch upon the run or plane the upright shafts B will be stationary, and the rubbing or scraping arms C should be raised through the connections E, as shown by dotted lines, Fig. 2, so as to be out of reach of the flow upon the run or plane. When the starch is deposited in a comparatively hard and compact mass to the desired depth upon the run, I dam or stop the run at the end or at intervals in its length and allow water to run in upon the starch deposit. The rubbing or scraping arms C are then lowered upon the starch and the upright shafts set in motion so as to move the arms C in circular paths over the surface of the starch deposit, said arms meanwhile resting with their weight upon the surface of the starch. By the combined action of the rubbing or scraping arms C and the water which is kept in rotary motion by said arms the starch will be gradually and completely liquefied, and the operation is continued until the arms C reach the bottom of the run or plane A, the arms being free to descend as the starch deposit is reduced in thickness.

I have indicated by dotted circles in Fig. 1 the area covered by the rubbing or scraping arms C in their movement, and by the motion of the water which they produce the portions of starch which are midway between the upright shafts and at the sides of the run are gradually worn away and liquefied, so that by the operation of the rubbing or scraping arms C the entire deposit of starch upon the run is liquefied without breaking up and shoveling the solid starch from the run, as is usual, and without removing to separate breaking vats or cisterns.

It will be observed that the lower or bearing surfaces or edges of the rubbing or scraping arms C are plain, straight, and destitute of any projections or teeth, as I find that by so constructing them the starch will be more easily liquefied, and thereby less liable to break up in lumps or fragments.

In order that the arms C in their travel may readily pass over any lumps or fragments of starch, I have shown their lower surfaces (see Fig. 4) as inclined downward and rearward reversely to their direction of movement, as indicated by the arrow.

In order to prevent the spattering of the liquefied starch when the arms C ride over the lumps or fragments of starch, I may attach to the top of the arms shields or aprons $d$, as shown in Fig. 4, which may be of sheet metal or other material, and which prevent the liquefied starch from spattering over the sides of the run.

What I claim as my invention, and desire to secure by Letters Patent, is—

1. The improvement in the manufacture of starch, consisting in first producing the deposition of the starch upon a starch-run or starch-plane, and in then adding water and liquefying the starch while still upon the run or plane, substantially as herein described.

2. The improvement in the manufacture of starch, consisting in first producing the deposition of starch upon a starch-run or starch-plane, and in then liquefying the starch while still upon the run or plane by the combined action of rubbers or scrapers and water kept in motion by the rubbers or scrapers, substantially as herein described.

3. The improvement in the manufacture of starch, consisting in first producing the deposition of starch upon starch-runs or starch-planes, and in then liquefying the starch while still upon the run or plane by the combined action of rotary rubbers or scrapers, and water kept in motion by the rubbers or scrapers, substantially as herein described.

4. The improvement in the method of liquefying compact and solid starch deposits, consisting in subjecting the surface of the deposit to the combined action of rubbers or scrapers and water kept in motion by the rubbers scrapers, substantially as herein described.

EDGAR E. DURYEA.

Witnesses:
C. HALL,
MINER LINDEMAN.